United States Patent Office 3,279,983
Patented Oct. 18, 1966

3,279,983
HALOPHENYL PHOSPHONOTHIOATES
Joseph W. Baker and John P. Chupp, Kirkwood, and Peter E. Newallis, Crestwood, Mo., assignors to Monsanto Company, a corporation of Delaware
No Drawing. Filed Mar. 13, 1961, Ser. No. 95,040
17 Claims. (Cl. 167—30)

This invention relates to novel phosphonothioates and to methods of making same. This invention also relates to insecticidal compositions comprising the phosphonothioates of this invention as an active ingredient.

The phosphonothioates of this invention can be represented by the formula

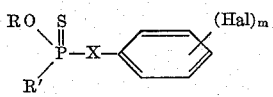

wherein "Hal" means halogen of atomic number in the range of 16 to 36 (i.e. chlorine or bromine, usually chlorine), wherein $m$ is a whole number from 1 to 5, wherein X is a chalkogen of atomic weight less than 40 (i.e. sulfur or oxygen), wherein R is a halogen substituted aliphatic hydrocarbon radical and wherein R' is a lower alkyl radical (i.e. methyl, ethyl, propyl, butyl, amyl, and the various isomeric forms thereof containing up to 5 carbon atoms).

By "halogen substituted aliphatic hydrocarbon radical" is meant alkyl or alkenyl or alkynyl radical containing from 2 to 6 carbon atoms, the halogen substitution of which being halogen having an atomic number in the range of 8 to 36 (i.e. fluorine, bromine or chlorine, but particularly chlorine). Usually the halogen substituents will not exceed a total of 3 and can be like or unlike. These radicals are further characterized in that the alpha-carbon thereof is free of any halogen substitution and contains 1 (i.e. secondary carbon) or 2 (i.e. primary carbon) hydrogen substituents. As illustrative of such radicals are 2-chloroethyl, 2-bromoethyl, 2-fluoroethyl, 2,2-dichloroethyl, 2,2-difluoroethyl, 2-chloropropyl, 2,3-dichloropropyl, 3,3-dichloropropyl, 2,3-dibromopropyl, 1-chlorobutyl-2, 1-chlorobutyl-3, 1-bromopropyl-2, 3-bromo-1-chloropropyl-2, 4-chlorobutyl-2, 3,4-dichlorobutyl, 3,4-dibromobutyl, 4,5dichloroamyl, 4-chlorohexyl, 4-chlorohexyl-3, 2,3,3-trichlorobutyl, 2,2,3-trichlorobutyl, 2-chloroallyl, 2-bromoallyl, 3-chloroallyl, 3-bromoallyl, 2,3-dichloroallyl, 3,3-dichloroallyl, 2,3,3-trichoroallyl, 3-chloromethallyl, 3-chloroethallyl, 3-chlorobut-2-enyl, 2-chlorobut-2-enyl, 5-chloropent-2-enyl, 3-chlorobut-2-ynyl, 4-bromobut-2-ynyl, etc.

These phosphonothioates can be prepared by reacting an appropriate acid halide of the structure

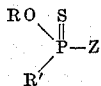

wherein R and R' have the above described significance and wherein Z is halogen of atomic number in the range of 16 to 36 (i.e. chlorine or bromine), with a compound of the structure

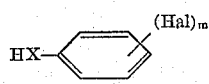

wherein X, Hal and $m$ have the above described significance, in an anhydrous medium in the presence of a hydrogen halide scavenging agent (e.g. sodium carbonate, potassium carbonate, the tertiary organic amines such as triethylamine, tributylamine, dimethylaniline, pyridine, 1,-pipecoline, lutidine, and the like) in an amount sufficient to absorb the hydrogen halide by-product. The scavenging agent can be added in an equivalent amount at the beginning of the reaction or throughout the course of the reaction. While a wide range of reaction temperatures can be employed provided the system is fluid (i.e. a temperature above the freezing point of the reaction system and up to and including the system's boiling point), it is preferred to employ a reaction temperature in the range of about 20° C. to about 120° C. Where and when desired an inert organic solvent can be used (e.g. benzene, toluene, xylene, acetone, butanone, dioxane, etc.).

As illustrative of the preparation of the new compounds, but not limitative thereof, are the following:

EXAMPLE I

To a suitable reaction vessel equipped with an agitator, reflux condenser and thermometer is charged at room temperature approximately 8.7 parts by weight (substantially 0.06 mol) of 4-chlorothiophenol and approximately 100 parts by weight of benzene, and approximately 6.6 parts by weight (substantially 0.065 mol) of triethylamine. To this mixture is slowly added approximately 11.6 parts by weight (substantially 0.06 mol) of O-(2-chloroethyl) methylphosphonothioic chloride and the mixture heated at 75–80° C. for 4 hours. The mass is then cooled to room temperature, and then washed first with water then with aqueous 3% sodium carbonate solution and finally with water. The so-washed organic solution is then stripped of solvent at 95° C. at 5 mm. pressure. The residue is O-(2-chloroethyl) S-(4-chlorophenyl) methyl phosphonodithioate, a solid (white needles from ether M.P. 93–95°) soluble in acetone and benzene but insoluble in water.

Analysis.—Theory 10.3% P, 21.3% S, 23.6% Cl. Found 10.2% P, 22.1% S, 23.8% Cl.

Employing the above procedure but replacing 4-chlorothiophenol with an equimolecular amount of 4-bromothiophenol there is obtained O-(2-chloroethyl) S-(4-bromophenyl) methylphosphonodithioate which is insoluble in water.

EXAMPLE II

To a suitable reaction vessel equipped with an agitator, reflux condenser and thermometer is charged at room temperature approximately 9.8 parts by weight (substantially 0.06 mol) of 3,4-dichlorophenol and approximately 100 parts by weight of benzene, and approximately 6.6 parts by weight (substantially 0.065 mol) of triethylamine. To this mixture is slowly added approximately 11.6 parts by weight (substantially 0.06 mol) of O-(2-chloroethyl) methylphosphonothioic chloride and the mixture heated at reflux for 4 hours. The mass is then cooled to room temperature. The organic solution is then washed first with water, then with an aqueous sodium carbonate solution and finally with water. The so-washed organic solution is then stripped of solvent at 95° C. at 100 mm. pressure. The residue is O-(2-chloroethyl) O-(3,4-dichlorophenyl) methylphosphonothioate, a pale yellow liquid soluble in acetone and benzene but insoluble in water.

Analysis.—Theory 9.7% P, 10.0% S, 33.3% Cl. Found 9.4% P, 10.6% S, 33.2% Cl.

Employing the above procedure but replacing 3,4-dichlorophenol with an equimolecular amount of 2,4-dichlorophenol there is obtained O-(2-chloroethyl) O-(2,4-dichlorophenyl) methylphosphonothioate which is insoluble in water

EXAMPLE III

To a suitable reaction vessel equipped with an agitator, reflux condenser and thermometer is charged at room temperature approximately 7.3 parts by weight (substantially 0.037 mol) of 2,4,6-trichlorophenol, approximately 100 parts by weight of benzene and approximately 3.8 parts by weight (substantially 0.038 mol) of triethylamine. To this mixture is slowly added approximately 7.0 parts by weight (substantially 0.036 mol) of O-(2-chloroethyl) methylphosphonothioic chloride and the mixture heated at 75–80° C. for 4 hours. The mass is then cooled to room temperature. The organic solution is then washed with water, then aqueous sodium carbonate solution and finally with water. The so-washed organic solution is then stripped of solvent at 95° C. at 5 mm. pressure. The residue is O-(2-chloroethyl) O-(2,4,6-trichlorophenyl) methylphosphonothioate, an amber liquid soluble in acetone and benzene but insoluble in water.

*Analysis.*—Theory 8.7% P, 40.0% Cl. Found 8.6% P, 39.9% Cl.

Employing the above procedure but replacing O-(2-chloroethyl) methylphosphonothioic chloride with an equimolecular amount of O-(2-chloroallyl) ethylphosphonothioic chloride there is obtained O-(2-chloroallyl) O-(2,4,6-trichlorophenyl) ethylphosphonothioate which is insoluble in water.

EXAMPLE IV

To a suitable reaction vessel equipped with an agitator, reflux condenser and thermometer is charged at room temperature approximately 4.35 parts by weight (substantially 0.03 mol) of 4-chlorothiophenol, approximately 100 parts by weight of benzene and approximately 4.1 parts by weight (substantially 0.04 mol) of triethylamine. To this mixture is slowly added approximately 6.6 parts by weight (substantially 0.03 mol) of O-(4-chlorobutyl) methylphosphonothioic chloride and the mixture heated at reflux for 4 hours. The mass is then cooled to room temperature. The organic solution is then washed first with water then with aqueous sodium carbonate solution and finally with water. The so-washed organic solution is then stripped of solvent at 95° C. at 5 mm. pressure. The residue is O-(4-chlorobutyl) S-(4-chlorophenyl) methylphosphonodithioate, a pale yellow liquid soluble in acetone and benzene but insoluble in water.

*Analysis.*—Theory 9.4% P, 19.4% S, 21.5% Cl. Found 8.8% P, 19.8% S, 22.0% Cl.

Employing the above procedure but replacing O-(4-chlorobutyl) methylphosphonothioic chloride with a substantially equimolecular proportion of O-(2-chloroethyl) ethylphosphonothioic chloride there is obtained O-(2-chloroethyl) S-(4-chlorophenyl) ethylphosphonodithioate which is insoluble in water.

EXAMPLE V

To a suitable reaction vessel equipped with an agitator, reflux condenser and thermometer is charged at room temperature approximately 4.4 parts by weight (substantially 0.03 mol) of 4-chlorothiophenol and approximately 100 parts by weight of benzene and approximately 4.1 parts by weight (substantially 0.04 mol) of triethylamine. To this mixture is slowly added approximately 7.8 parts by weight (substantially 0.03 mol) of O-(2,2,2-trichloroethyl) methylphosphonothioic chloride and the mixture heated at reflux for 4 hours. The mass is then cooled to room temperature, then washed first with water and then with an aqueous sodium carbonate solution and finally with water. The so-washed organic solution is then stripped of solvent at 95° C. at 5 mm. pressure. The residue is O-(2,2,2-trichloroethyl) S-(4-chlorophenyl) methylphosphonodithioate, a pale yellow liquid soluble in acetone and benzene but insoluble in water.

*Analysis.*—Theory 8.4% P, 17.3% S, 38.4% Cl. Found 8.1% P, 16.0% S, 37.9% Cl.

Employing the above procedure but replacing O-(2,2,2-trichloroethyl) methylphosphonothioic chloride with an equimolecular amount of O-(3-chlorobut-2-enyl) ethylphosphonothioic bromide there is obtained O-(3-chlorobut-2-enyl) S-(4-chlorophenyl) ethylphosphonodithioate.

EXAMPLE VI

To a suitable reaction vessel equipped with an agitator, reflux condenser and thermometer is charged at room temperature approximately 9.4 parts by weight (substantially 0.06 mol) of 4-bromophenol, approximately 100 parts by weight of benzene and approximately 6.6 parts by weight (substantially 0.065 mol) of triethylamine. To this mixture is slowly added approximately 11.6 parts by weight (substantially 0.06 mol) of O-(2-chloroethyl) methylphosphonothioic chloride, and the mixture heated at reflux for 4 hours. The mass is then cooled to room temperature, and then washed first with water then with aqueous sodium carbonate solution and finally with water. The so-washed organic solution is then stripped of solvent at 95° C. at 5 mm. pressure. The residue is O-(2-chloroethyl) O-(4-bromophenyl) methylphosphonothioate, a pale yellow liquid soluble in acetone but insoluble in water.

*Analysis.*—Theory 9.4% P, 24.3% Br, 10.8% Cl. Found 9.6% P, 23.1% Br, 11.7% Cl.

Employing the above procedure but replacing O-(2-chloroethyl) methylphosphonothioic chloride and 4-bromophenol, respectively, with equimolecular amounts of 4-chlorothiophenol and O-(3,3-dichloropropyl) methylphosphonothioic chloride there is obtained O-(3,3-dichloropropyl) S-(4-chlorophenyl) methylphosphonodithioate which is insoluble in water.

EXAMPLE VII

To a suitable reaction vessel equipped with an agitator, reflux condenser and thermometer is charged at room temperature approximately 4.4 parts by weight (substantially 0.03 mol) of 4-chlorothiophenol, approximately 200 parts by weight of benzene and approximately 4.1 parts by weight (substantially 0.04 mol) of triethylamine. To this mixture is slowly added approximately 7.1 parts by weight (substantially 0.03 mol) of O-(2-bromoethyl) methylphosphonothioic chloride, and the mixture heated at reflux for 5 hours. The mass is then cooled to room temperature then washed first with water then with aqueous sodium carbonate solution and then with water. The so-washed organic solution is then stripped of solvent at 100° C. at 3 mm. pressure. The residue is O-(2-bromoethyl) S-(4-chlorophenyl) methylphosphonodithioate, an amber liquid soluble in acetone but insoluble in water.

Employing the above procedure but replacing O-(2-bromoethyl) methylphosphonothioic chloride with a molecularly equivalent amount of O-(2-chloroethyl) n-amylphosphonothioic chloride there is obtained O-(2-chloroethyl) S-(4-chlorophenyl) n-amylphosphonodithioate which is soluble in acetone but insoluble in water.

EXAMPLE VIII

To a suitable reaction vessel equipped with an agitator, reflux condenser and thermometer is charged at room temperature approximately 2.6 parts by weight (substantially 0.018 mol) of 4-chlorothiophenol, approximately 100 parts by weight of benzene and approximately 3.1 parts by weight (substantially 0.03 mol) of triethylamine. To this mixture is slowly added approximately 4.2 parts by weight (substantially 0.018 mol) of O-(2,3-dichloropropyl) methylphosphonothioic chloride, and the mixture heated at reflux for 5 hours. The mass is then cooled to room temperature, then washed first with water, then with aqueous sodium carbonate solution and finally with water. The so-washed organic solution is then stripped of solvent at 95° C. at 5 mm. pressure. The residue is O-(2,3-dichloropropyl) S-(4-chlorophenyl) phenylphosphonodithioate, a pale yellow liquid which solidified on standing to a white solid (M.P. 77–78°) soluble in acetone but insoluble in water.

*Analysis.*—Theory 8.9% P, 18.3% S. Found 8.7% P, 19.2% S.

Employing the above procedure but replacing 4-chlorothiophenol with a substantially equivalent amount of 2,4,5-trichlorophenol there is obtained O-(2,3-dichloropropyl) O-(2,4,5-trichlorophenyl) methylphosphonothioate which is soluble in acetone but insoluble in water.

EXAMPLE IX

To a suitable reaction vessel equipped with an agitator, reflux condenser and thermometer is charged at room temperature approximately 4.3 parts by weight (substantially 0.03 mol) of 4-chlorothiophenol, approximately 150 parts by weight of benzene and approximately 4.1 parts by weight (substantially 0.04 mol) of triethylamine. To this mixture is slowly added approximately 6.8 parts by weight (substantially 0.03 mol) of O-(2,2-dichloroethyl) methylphosphonothioic chloride, and the mixture heated at reflux for 5 hours. The mass is then cooled to room temperature, washed first with water, then with aqueous sodium carbonate solution and then with water. The so-washed organic solution is then stripped of solvent at 95° C. at 5 mm. pressure. The residue is O-(2,2-dichloroethyl) S-(4-chlorophenyl) methylphosphonodithioate, a pale yellow liquid which solidified on standing to a white solid (recrystallized from hexane gave a melting point of 76.5–77.5°).

*Analysis.*—Theory 9.25% P, 19.1% S, 31.6% Cl. Found 9.1% P, 19.6% S, 31.6% Cl.

Employing the above procedure but replacing O-(2,2-dichloroethyl) methylphosphonothioic chloride with an equivalent amount of O-(2,3-dichloroallyl) methylphosphonothioic bromide there is obtained O-(2,3-dichloroallyl) S-(4-chlorophenyl) methylphosphonodithioate which is insoluble in water.

The methods by which the halophenyl phosphonothioates of this invention are isolated will vary slightly with the reactants employed and the product produced. Further purification by selective solvent extraction or by absorptive agents such as activated carbon or clays can precede the removal of the inert organic liquid or solvent when such is employed. Additionally an inert organic solvent can be added to and in the purification by absorptive agents. However, the product is generally satisfactory for insecticidal purposes without further purification.

Other phenols or thiophenols operable in the process of this invention include 2-chlorophenol, 3-chlorophenol, 2-bromophenol, 2-chloro-4-bromophenol, 2,4-dibromophenol, 2,4,5-tribromophenol, 2,3,4,5-tetrachlorophenol, 2,3,4,5,6-pentachlorophenol, 2,3,4,5,6-pentabromophenol, etc., and the corresponding thiophenols (e.g. 2-chlorothiophenol, 3-bromothiophenol, 2,4-dichlorothiophenol, 2,3,4,5,6-pentachlorothiophenol, etc.).

Of the phosphonothioates of this invention a particularly useful group are those of the formula

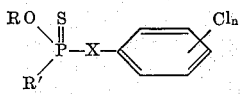

wherein $n$ is a whole number from 1 to 2, wherein R is a chlorine substituted alkyl radical containing from 2 to 4 carbon atoms and from 1 to 3 chlorine substituents, the alpha-carbon of said R containing two hydrogen substituents, wherein X is a chalkogen of atomic weight less than 40 (i.e. sulfur or oxygen) and wherein R' is an alkyl radical containing 1 to 2 carbon atoms (i.e. methyl or ethyl, preferably methyl).

It will be understood that the terms "insect" and "insecticide" are used herein in their broad common usage to include spiders, mites, ticks, and like pests which are not in the strict biological sense classed as insects. Thus the usage herein conforms to the definitions provided by Congress in Public Law 104, the "Federal Insecticide, Fungicide, and Rodenticide Act" of 1947, Section 2, subsection h, wherein the term "insect" is used to refer not only to those small invertebrate animals belonging mostly to the class Insecta, comprising six-legged, usually winged forms, as bettles, bugs, bees, flies, and so forth, but also to other allied classes of arthropods whose members are wingless and usually have more than six legs, as spiders, mites, ticks, centipedes, and wood lice.

The phosphonothioates of this invention are effective against a wide variety of insect pests. As illustrative of their activity but not limitative thereof is the following:

Contact activity

A rimless, 25 x 200 mm. culture tube is rinsed with acetone and is placed in a holding block. The tube is filled with 70 cc. of distilled water. Next 0.1 cc. of liquid or 0.1 gr. of solid test chemical is dissolved in acetone to make a 1% by weight concentrate of the test chemical. 0.07 ml. of this concentrate is pipetted into the culture tube containing the distilled water. The tube is then stoppered with an acetone washed rubber stopper and shaken vigorously to facilitate complete mixing. Approximately 25 early fourth instar yellow fever mosquito larvae (*Aedes aegypti*) are transferred to the tube with the aid of a pipette. The larvae are held in the test tube at room temperature for 24 hours at which time mortality observations are taken. This procedure is repeated at decreasing concentrations and a low concentration giving 100% mortality determined. The following results were obtained.

| Test Chemical | | Conc. giving 100% mortality in p.p.m. |
|---|---|---|
| O-(2-chloroethyl) | S-(4-chlorophenyl) methylphosphonodithioate | 0.008 |
| O-(2-chloroethyl) | O-(3,4-dichlorophenyl) methylphosphonothioate | 0.125 |
| O-(4-chlorobutyl) | S-(4-chlorophenyl) methylphosphonodithioate | 0.04 |
| O-(2-bromoethyl) | S-(4-chlorophenyl) methylphosphonodithioate | 0.04 |
| O-(2,3-dichloropropyl) | S-(4-chlorophenyl) methylphosphonodithioate | 0.04 |
| O-(2,2-dichloroethyl) | S-(4-chlorophenyl) methylphosphonodithioate | 0.04 |

Insect feeding activity

A 1% by weight concentrate is prepared by dissolving the test chemical in 10 ml. of acetone. A 0.25 cc. tuberculin, B–D Yale syringe is filled with this concentrate and placed in a microinjection apparatus. The injector lever is pressed several times to make certain no air bubbles are trapped in the needle and the needle is wiped with filter paper to remove excess solution. The injector lever is pressed once to produce one microliter which is applied directly to each of 12 lima bean leaf discs 0.25 inch in diameter. Single second instar southern armyworm larvae (*Prodenia eridania*) are placed on each disc and the disc encaged with a plastic cap. After 48 hours at room temperature mortality observations are made. This procedure is repeated at decreasing concentrations and the percent mortality at certain low concentrations determined. The results were as follows:

| Test Chemical | | Activity | |
|---|---|---|---|
| | | Conc. in percent by weight | Mortality, percent |
| O-(2-chloroethyl) | S-(4-chlorophenyl) methylphosphonodithioate | 0.016 | 100 |
| O-(2-chloroethyl) | O-(3,4-dichlorophenyl) methylphosphonothioate | 0.016 | 100 |
| O-(2-chloroethyl) | O-(2,4,6-trichlorophenyl) methylphsophonothioate | 0.25 | 100 |
| O-(4-chlorobutyl) | S-(4-chlorophenyl) methylphosphonodithioate | 0.02 | 100 |
| O-(2-chloroethyl) | O-(4-bromophenyl) methylphosphonothioate | 0.063 | 100 |
| O-(2-bromoethyl) | S-(4-chlorophenyl) methylphosphonodithioate | 0.02 | 100 |
| O-(2,3-dichloropropyl) | S-(4-chlorophenyl) methylphosphonodithioate | 0.02 | 90 |
| O-(2,2-dichloroethyl) | S-(4-chlorophenyl) methylphosphonodithioate | 0.02 | 100 |

*Activity on insect body*

A 1% by weight concentrate of the test chemical is prepared by dissolving the chemical in 10 ml. of acetone. A 0.25 cc. tuberculin, B–D Yale syringe is filled with the concentrate and placed in a microinjection apparatus. The injector lever is pressed several times to make certain that no air bubbles are trapped in the needle and the needle is wiped with filter paper to remove any excess solution. The injector lever is pressed once to produce one microliter which is applied directly to the ventral side of the abdomen of each of 10 plum curculio, *Conotrachelus nenuphar*. After application each insect is released within observation dishes and held for 24 hours at room temperature and mortality observations made at the end of that time. This procedure is repeated at decreasing concentrations and the percent mortality at certain low concentrations determined. The following results were obtained:

| Test Chemical | | Activity | |
|---|---|---|---|
| | | Conc. in percent by weight | Mortality, percent |
| O-(2-chloroethyl) | S-(4-chlorophenyl) methylphosphonodithioate | 0.063 | 100 |
| O-(4-chlorobutyl) | S-(4-chlorophenyl) methylphosphonodithioate | 0.2 | 100 |
| O-(2-bromoethyl) | S-(4-chlorophenyl) methylphsophonodithioate | 0.02 | 100 |
| O-(2,3-dichloropropyl) | S-(4-chlorophenyl) methylphosphonodithioate | 0.2 | 60 |

Although the phosphonothioates of this invention are useful per se in controlling a wide variety of insect pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphonothioates of this invention are dispersed, it means that particles of the phosphonothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g. pellets, granules, powders, or dusts. The term "dispersed" also includes mixtures which are suitable for use as aerosols including solutions, suspensions, or emulsions of the phosphonothioates of this invention in a carrier such as dichlorodifluoromethane and the like fluorochloroalkanes which boil below room temperature at atmospheric pressure.

In the instant specification and appended claims it is to be understood that the expression "extending agent" includes any and all of those substances in which the phosphonothioates of this invention are dispersed. It includes, therefore, the solvents of a true solution, the liquid phase of suspensions, emulsions or aerosols, the semi-solid carrier of ointments and the solid phase of particulate solids, e.g. pellets, granules, dusts and powders.

The exact concentration of the phosphonothioates of this invention employed in combatting or controlling insect pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions, or aerosols) the concentration of the phosphonothioate employed to supply the desired dosage generally will be in the range of 0.001 to 50 percent by weight. When the extending agent is a semi-solid or solid, the concentration of the phosphonothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared insecticidal spray or particulate solid. In such a concentrate composition, the phosphonothioate generally will be present in a concentration of 5 to 95 percent by weight, the residue being any one or more of the well known insecticidal adjuvant, such as the various surface active agents (e.g. detergents, a soap or other emulsifying or wetting agent), surface-active clays, solvents, diluents, carrier media, adhesives, spreading agents, humectants, and the like.

There are a large number of organic liquids which can be used for the preparation of solutions, suspensions or emulsions of the phosphonothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F. at atmospheric pressure and having a flash point above about 80° F., particularly kerosene), mineral oils having an unsulfonatable residue above about 80 percent and perferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphonothioates of this invention are to be supplied to the insect pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphonothioates of this invention are preferably supplied to the insect pests or to the environment of the insect pests in the form of emulsions or suspensions. Emulsions or suspensions are prepared by dispering the phosphonothioate of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc., New York) in place of the expression "emulsifying agent" to connote generically the various "emulsifying agents," "dispersing agent," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," Second edition, page 280). These surfactants include the well-known capillary-active substances which may be anion-active (or anionic), cation active (or cationic), or non-ionizing (or non-ionic) which are described in detail in volume I and II of Schwartz, Perry and Berch's "Surface Active Agents and Detergents" (1958, Interscience Publishers, Inc. New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to surfactants, i.e. the anion-active, cation-active and the non-ionizing capillary active substances, are incorporated in this specification by reference in order to avoid unnecessary enlargement of this specification. The preferred surfactants are the water-soluble anionic surface-active agents and the water soluble non-ionic surface-active agents set forth in U.S. 2,846,398 (issued August 5, 1958). In general it is preferred that a mixture of water-soluble anionic and water soluble non-ionic surfactants be employed.

The phosphonothioates of this invention can be dispersed by suitable methods (e.g. tumbling or grinding) in solid extending agents either of organic or inorganic nature and supplied to the insect pests environment in particulate form. Such solid materials include for example, tricalcium phosphate, calcium carbonate, kaolin, bole, kieselguhr, talc, bentonite, fuller's earth, pyrophyllite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble surfactants or wetting agents the dry particulate solids can be rendered wettable by water so as to obtain stable aqueous dispersions or suspensions suitable for use as sprays.

For special purposes the phosphonothioates of this invention can be dispersed in a semi-solid extending agent such as petrolatum or soap (e.g. sodium stearate or oleate or palmitate or mixtures thereof) with or without the aid of solubility promotors and/or surfactants or dispersing agents.

In all of the forms described above the dispersions can be provided ready for use in combatting insect pests or they can be provided in a concentrated form suitable for mixing with or dispersing in other extending agents. As illustrative of a particularly useful concentrate is an intimate mixture of phosphonothioate of this invention with a water-soluble surfactant which lowers the surface tension of water in the weight proportions of 0.1 to 15 parts of surfactant with sufficient of the phosphonothioate of this invention to make 100 parts by weight. Such a concentrate is particularly adapted to be made into a spray for combatting various forms of insect pests by the addition of water thereo. As illustrative of such a concentrate is an intimate mixture of 95 parts by weight of O-(2-chloroethyl) S-(4-chlorophenyl) methylphosphonodithioate and 5 parts by weight of a water-soluble non-ionic surfactant such as the polyoxyethylene derivative of sorbitan monolaurate.

Another useful concentrate adapted to be made into a spray for combatting a variety of insect pests is a solution (preferably as concentrated as possible) of a phosphonothioate of this invention in an organic solvent therefor. The said liquid concentrate preferably contains dissolved therein a minor amount (e.g. 0.5 to 10 percent by weight of the weight of the new insecticidal agent) of a surfactant (or emulsifying agent), which surfactant is also water-soluble. As illustrative of such a concentrate is a solution of O-(2-chloroethyl) S-(4-chlorophenyl) methylphosphonodithioate in benzene which solution contains dissolved therein a water-soluble polyoxyethylene glycol non-ionic surfactant and a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well known water-soluble alkali metal alkylaryl sulfonates as exemplified by sodium decylbenzene sulfonate and sodium dodecylbenzene sulfonate. Of the non-ionic surfactants, the particularly preferred are the water-soluble polyoxyethylene derivative of alkylphenols (particularly isooctylphenol) and the water-soluble polyoxyethylene derivatives of the mono-higher fatty acid esters of hexitol anhydrides (e.g. sorbitan). These materials in general contain 15 to 30 moles of ethylene oxide per mole of the hexitol anhydride or the alkylphenol.

In all of the various dispersions described hereinbefore for insecticidal purposes, the active ingredient can be one or more of the compounds of this invention. The compounds of this invention can also be advantageously employed in combination with other pesticides, including for example, nematocides, bactericides, and herbicides. In this manner it is possible to obtain mixtures which are effective against a wide variety of pests and other forms of noxious life.

In controlling or combatting insect pests the phosphonothioates of this invention either per se or compositions comprising same are supplied to the insect pests or to their environment in a lethal or toxic amount. This can be done by dispersing the new insecticidal agent or insecticidal composition comprising same in, on or over an infested environment or in, on or over an environment the insect pests frequent, e.g. agricultural soil or other growth media or other media infested with insect pests or attractable to the pests for habitational or sustenance or propagational purposes, in any conventional fashion which permits contact between the insect pests and the phosphonothioates of this invention. Such dispersing can be brought about by applying sprays or particulate solid compositions to a surface infested with the insect pests or attractable to the pests, as for example, the surface of an agricultural soil or other media such as the above ground surface of plants by any of the convention methods, e.g. power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the insect pests frequent, or by employing a liquid carrier for the new insecticidal agent to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A phosphonodithioate of the formula

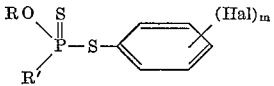

wherein "Hal" means halogen of atomic number in the range of 16 to 36, wherein m is a whole number from 1 to 5, wherein R' is a lower alkyl radical, and wherein R is a halogen substituted aliphatic hydrocarbon radical containing from 2 to 6 carbon atoms, the alpha-carbon of said R being free of halogen substitution and containing from 1 to 2 hydrogen substituents, the halogen substitution in said R being halogen of atomic number in the range of 8 to 36.

2. A phosphonodithioate of the formula

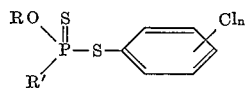

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents.

3. O-(4-chlorophenyl) methylphosphonodithioate of the formula

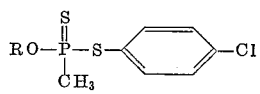

wherein R is a chlorine substituted alkyl radical containing 2 to 4 carbon atoms and from 1 to 3 chlorine substituents, the alpha-carbon of said R containing two hydrogen substituents.

4. O-(2-chloroethyl) S-(4-chlorophenyl) methylphosphonodithioate.

5. O-(4-chlorobutyl) S-(4-chlorophenyl) methylphosphonodithioate.

6. O-(2,2-dichloroethyl) S-(4-chlorophenyl) methylphosphonodithioate.

7. O-(2,3-dichloropropyl) S-(4-chlorophenyl) methylphosphonodithioate.

8. An insecticidal composition comprising a compound of claim 1 dispersed in an extending agent.

9. An insecticidal composition comprising a phosphonodithioate of the formula

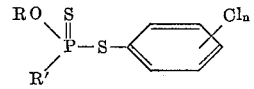

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents, dispersed in an extending agent selected from the group consisting of solid and semi-solid extending agents, the composition containing 0.1 to 25 percent by weight of said phosphonodithioate.

10. An insecticidal composition comprising a phosphonodithioate of the formula

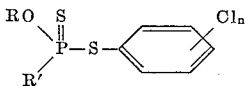

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents, dispersed in a liquid extending agent, the composition containing 0.001 to 50 percent by weight of said phosphonodithioate.

11. An insecticidal concentrate comprising a phosphonodithioate of the formula

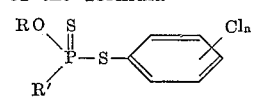

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents, and an insecticidal adjuvant, said concentrate containing from 5 to 95 percent by weight of the said phosphonodithioate.

12. An insecticidal concentrate comprising a phosphonodithioate of the formula

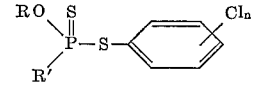

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents, dispersed in an organic solvent therefor and having dissolved therein a minor amount of a water-soluble surfactant, said concentrate forming an emulsion with water upon agitation therewith.

13. An insecticidal concentrate adapted to be made into a sprayable composition by the addition of water comprising a phosphonodithioate of the formula

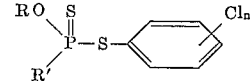

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents in admixture with a water-soluble surfactant in the weight proportion of 0.1 to 15 parts of surfactant and sufficient of said phosphonodithioate to make 100 parts by weight.

14. The method of controlling insects which comprises contacting the insects with a toxic amount of at least one compound of claim 1.

15. The method of controlling insects which comprises contacting the insects with a toxic amount of at least one phosphonodithioate of the formula

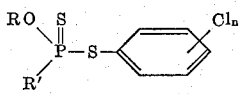

wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents.

16. The method for protection of plants against insect attack which comprises applying to the plant an insecticidal amount of at least one compound of claim 1.

17. The method for protection of plants against insect attack which comprises applying to the plant an insecticidal amount of at least one phosphonodithioate of the formula wherein $n$ is a whole number from 1 to 2, wherein R' is an alkyl radical containing 1 to 2 carbon atoms, and wherein R is a chlorine substituted alkyl radical containing from 2 to 4 carbon atoms and from 1 to 3 chlorine substituents, the alpha-carbon of said R containing two hydrogen substituents.

References Cited by the Examiner

UNITED STATES PATENTS

| | | | |
|---|---|---|---|
| 2,906,769 | 9/1959 | Slagh | 260—461 |
| 2,910,402 | 10/1959 | Fairchild | 260—461 |
| 2,967,884 | 1/1961 | Dunn et al. | 260—461 |
| 2,988,474 | 6/1961 | Szabo et al. | 260—461 |
| 3,096,238 | 7/1963 | Baker et al. | 260—461 X |
| 3,099,597 | 7/1963 | Chupp et al. | 260—461 X |

FOREIGN PATENTS

| | | |
|---|---|---|
| 814,152 | 9/1951 | Germany. |
| 133,880 | 12/1960 | U.S.S.R. |

CHARLES B. PARKER, *Primary Examiner.*

MAYER LIEBMAN, WALTER A. MODANCE,
*Examiners.*

F. M. SIKORA, N. H. STEPNO, D. R. PHILLIPS,
*Assistant Examiners.*